Figure 3:
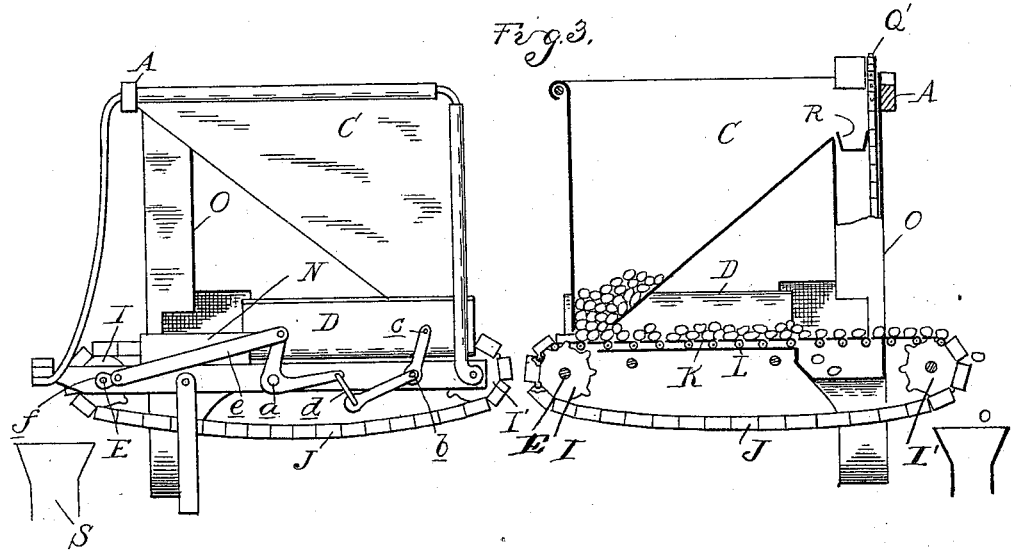

(No Model.) 2 Sheets—Sheet 1.
J. W. ROMINE.
PLANTER.
No. 579,683. Patented Mar. 30, 1897.
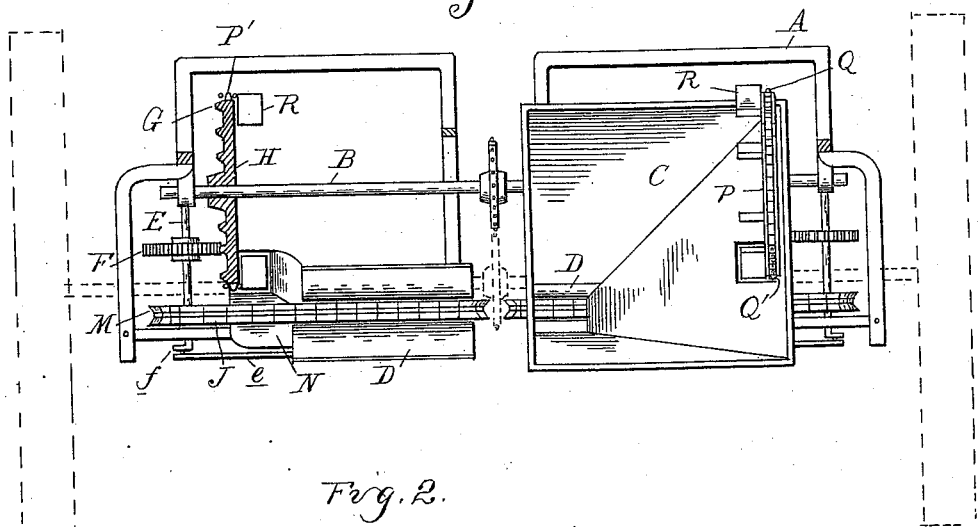
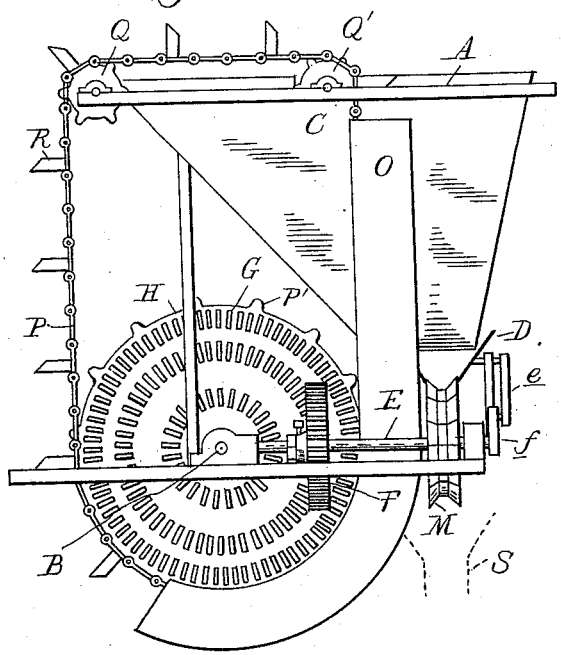
Witnesses
A. L. Hobby
O. F. Barthel
Inventor
John W. Romine
By Wm. S. Sprague & Son
Attys.

(No Model.) 2 Sheets—Sheet 2.

J. W. ROMINE.
PLANTER.

No. 579,683. Patented Mar. 30, 1897.

Witnesses
A. L. Hobby
O. H. Bartlett

Inventor
John W. Romine
By Thos. A. Sprague & Son
Attys.

UNITED STATES PATENT OFFICE.

JOHN W. ROMINE, OF WALTZ, MICHIGAN.

PLANTER.

SPECIFICATION forming part of Letters Patent No. 579,683, dated March 30, 1897.

Application filed April 23, 1896. Serial No. 588,785. (No model.)

*To all whom it may concern:*

Be it known that I, JOHN W. ROMINE, a citizen of the United States, residing at Waltz, in the county of Wayne and State of Michigan, have invented certain new and useful Improvements in Planters, of which the following is a specification, reference being had therein to the accompanying drawings.

The invention consists in the construction of a planter especially designed for potatoes, but which may be used for other purposes, if desired.

The novelty lies in the construction of the feed devices for delivering the seed from the hopper and in devices for returning any surplus seed to the hopper, and in the construction, arrangement, and combination of the various parts, all as more fully hereinafter described.

In the drawings I have shown my improvement applied to a two-row machine. I do not desire this in any way to be considered as a limitation in its use.

Figure 4:
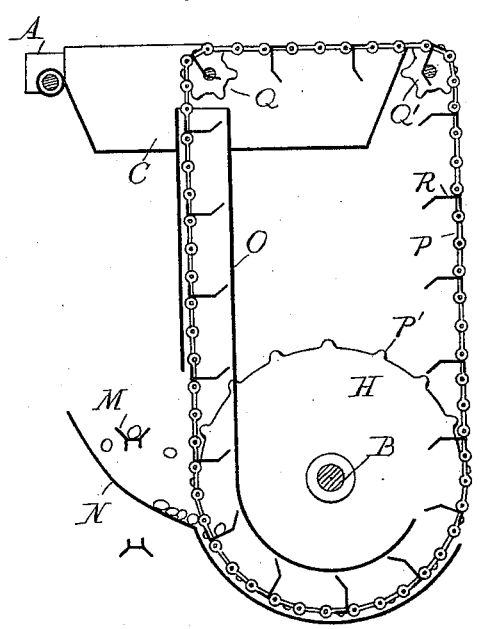
Figure 5:
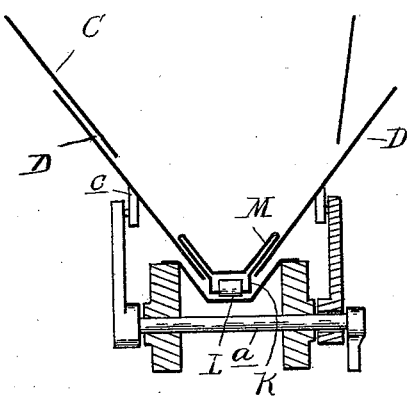

Figure 1 is a sectional plan of a planter embodying my invention, the frame, ground-wheels, and draft attachment being omitted, as they may be of any desired construction. Fig. 2 is a side elevation of one hopper and its feed devices of a slightly-modified construction. Fig. 3 is a rear elevation of Fig. 1, one-half in section on a line through the horizontal feed-chain. Fig. 4 is a section through the vertical elevator for carrying the surplus seed back to the hopper, and Fig. 5 is an enlarged cross-section through the lower portion or throat of the hopper.

A description of one hopper and its feed devices will answer for both.

A is a suitable frame on which the operative parts of my planter are mounted.

B is the drive-shaft journaled in suitable bearings in the frame and driven in any suitable manner.

C is a hopper.

D are vibrating throat-plates at the lower end or discharge of the hopper, these plates being of sufficient length to form in effect a trough, and they are reciprocated in opposite directions by any suitable mechanism, preferably that shown in the drawings, comprising two crank-shafts $a$ $b$, journaled beneath these throat-plates, each shaft having a crank-arm connected to one plate, the other end of the plate being suspended upon a link $c$, pivoted on the other end of the trough, and the two cranks being connected, as by the link $d$, so that a common connecting-rod $e$ will actuate them, the connecting-rod $e$ being actuated from a crank $f$ upon the shaft E. These throat-plates prevent the clogging or choking of the throat of the hopper.

The shaft E is journaled in bearings on the frame and is driven through the gear-wheel F, which is adjustable on the shaft and engages with any one of the series of teeth G, concentrically arranged on the wheel H, which in turn is secured to the shaft B. By adjusting the wheel F the speed at which this shaft E is driven from the wheel H is correspondingly adjusted. On the shaft E is a sprocket-wheel I, over which the endless seed-chain J passes, the other end of this chain passing over a sprocket-wheel I' at the other side of the frame. This feed-chain is comprised of links K, preferably having rollers L to engage between the teeth of the sprocket-wheels and provided with the flanges M on the top, forming a shallow trough. This chain runs beneath the hopper and between the plates D, forming, preferably, a complementary bottom section of the hopper or trough, the upper portion of which hopper-trough is formed by the plates D. The trough portions of the links, when running in horizontal planes, form a practically continuous shallow trough, as shown. At the ends of the throat-plates on each side of the upper run of the seed-chain is a hopper N, which fits into a vertical tube or trough O, in which runs an elevator. This elevator comprises a sprocket-chain P, engaging with teeth P' on the periphery of the gear-wheel H, and at the upper end engages with the two separate sprocket-wheels Q Q', which are journaled in suitable bearings in the upper end of the hopper. On the side of this chain—that is, to one side of the plane of movement of the chain or a plane passing through and including two opposite runs of the chain—are the buckets R, rigidly secured and constructed so that they will stand horizontally in the vertical movement of the chain through the trough O, but will turn into a vertical position to discharge their contents into the hopper in turning over the sprocket-wheel Q. In Figs. 1 and 4 these buckets are shown extending inwardly and in Fig. 2 as extending outwardly from the chain.

The parts being thus constructed, their operation is as follows: The seed being placed in the hopper and motion imparted to the vehicle on which the planter is located, the seed-chain J, running in the trough at the lower end of the hopper, will carry the seed horizontally thereon between the throat-plates D. In practice it has been found that such a chain will feed at points bunches or clusters of the seed by moving along those pieces which may be superimposed upon the seed supported in one of the links of the chain. I take care of this surplus seed and effect perfectly even planting by arranging at the end of the trough formed by the throat-plates the hopper N, into which such surplus seed will fall and be carried up and delivered back into the hopper, while a continuous line of seed will be carried along to the end of the chain and be deposited into the spout S and through the spout into the ground. The speed at which the feed is effected can be perfectly adjusted by adjusting the wheel F in or out.

In case it is desired to have the articles from both hoppers fed into the common spout I can arrange to have them fed that way, and have, for instance, fertilizer fed from one hopper and the seed from the other, and thus feed the fertilizer with the seed, as desired.

While I have shown a specific construction, I do not desire to be limited to the exact construction shown, as I believe I am the first to provide a free feed from the hopper with means for selecting a given quantity therefrom and devices for taking care of the surplus seed or other material to be fed. I also believe that I am the first to construct an elevator in which the buckets are on the side of the chain, so that they will not only elevate but will discharge the material therein at the top to one side of the vertical trunk in which the elevator runs, and also of the construction of links for the feed-chain herein described.

What I claim as my invention is—

1. The combination with a hopper, of plates on opposite sides of its discharge end, and a feed-chain between said plates formed of trough-shaped links which form an uninterrupted trough-shaped bottom for the hopper.

2. The combination with the hopper, the oppositely-arranged vibrating throat-plates, and a feed-chain between the plates.

3. The combination with the hopper, oppositely-arranged vibrating throat-plates, extended to form a trough, and a feed-chain having trough-shaped links, running between the throat-plates.

4. The combination with the hopper, of the oppositely-arranged throat-plates D at the discharge, the supporting-links c and the connecting actuating-cranks a for actuating said plates.

5. The combination with a hopper, a feed therefrom, devices for selecting a desired quantity of the seed, and devices for conveying the surplus back to the seed-hopper.

6. The combination with a hopper, an endless seed-feed at the discharge thereof, a second hopper beside said feed, into which any surplus seed falls, and means for delivering seed therefrom into the main hopper.

7. The combination of an elevator-chain, means for driving the same, and buckets carried by and located at the side of the chain out of the plane of movement of the latter.

8. The combination with the sprocket-wheels, of a chain thereon, buckets secured to and located on one side of the chain, out of the plane of movement of the latter and a hopper across which the horizontal portion of the chain passes.

9. The combination with the hopper, the horizontal seed-chain leading therefrom, a second hopper beside the seed-chain into which the surplus seed falls, and an elevator for returning such surplus to the main hopper.

10. The combination of the main drive-shaft B, the wheel H having a concentric series of gears G thereon, peripheral teeth on said wheel H, the counter-shaft E, the adjustable gear F on said counter-shaft adapted to engage with the gears G, a horizontal feed-chain driven from the shaft E, and the vertical elevator engaging the peripheral teeth on the wheel H.

In testimony whereof I affix my signature in presence of two witnesses.

JOHN W. ROMINE.

Witnesses:
M. B. O'DOGHERTY,
O. F. BARTHEL.